United States Patent [19]

Takada et al.

[11] Patent Number: 4,542,062
[45] Date of Patent: Sep. 17, 1985

[54] MAGNETIC RECORDING MEDIUM

[75] Inventors: Kazuo Takada; Seitoku Saito, both of Tokyo, Japan

[73] Assignee: TDK Electronics Co., Ltd., Tokyo, Japan

[21] Appl. No.: 341,059

[22] Filed: Jan. 20, 2982

[30] Foreign Application Priority Data

Mar. 7, 1981 [JP] Japan .................. 56-32764
Mar. 12, 1981 [JP] Japan .................. 56-34601

[51] Int. Cl.⁴ ............................. G11B 5/64
[52] U.S. Cl. .................... 428/336; 336/134; 336/135; 336/136; 427/128; 427/132; 204/192 M; 428/694; 428/900
[58] Field of Search ............... 428/336, 900, 694, 695, 428/693; 427/132, 128; 204/192 M; 360/134–136

[56] References Cited

U.S. PATENT DOCUMENTS

| | | | |
|---|---|---|---|
| 3,023,166 | 2/1962 | Duinker | 252/62.54 |
| 3,965,463 | 6/1976 | Chaudhari | 365/36 |
| 4,002,546 | 1/1977 | Shirohata et al. | 427/132 |
| 4,202,932 | 5/1980 | Chen | 428/900 |
| 4,226,681 | 10/1980 | Shirahata | 427/132 |
| 4,354,908 | 10/1982 | Shirahata | 427/132 |
| 4,399,013 | 8/1983 | Sugita | 427/132 |
| 4,452,864 | 6/1984 | Kitahara | 428/694 |
| 4,454,195 | 6/1984 | Fukuda | 428/458 |

FOREIGN PATENT DOCUMENTS 0576598 10/1977 U.S.S.R. .................. 427/132

OTHER PUBLICATIONS

Y. Maeda, "Prep. of Perpendicular Magnetic Co—Cr Films by Vacuum Evaporation", *Japanese Journal of App. Physics,* vol. 20, No. 7 (Jul. 1981), pp. L467-L469.

*Primary Examiner*—Ellis P. Robinson
*Attorney, Agent, or Firm*—Oblon, Fisher, Spivak, McClelland & Maier

[57] ABSTRACT

A magnetic recording medium comprises a magnetic alloy layer on a substrate wherein said magnetic alloy layer is made of 70–90 wt. % of Co and 30–10 wt. % of at least one of Si, Sb, Li, V, Ta, Ge and Pt and a magnetization axis of said magnetic alloy is substantially vertical to said layer.

2 Claims, No Drawings

MAGNETIC RECORDING MEDIUM

BACKGROUND OF THE INVENTION

1. Field of the Invention

The present invention relates to a vertical type magnetic recording medium.

2. Description of the Prior Art

A vertical type magnetic recording medium has been proposed as a new recording system for super dense recording (Japanese Unexamined Patent Publication No. 134706/1977).

The magnetic medium used for this purpose must have high magnetic anisotropy in vertical direction on the layer and high coercive force. It has been disclosed that a Co—Cr layer prepared by a high frequency sputtering process is excellent medium suitable for the aforementioned condition.

SUMMARY OF THE INVENTION

It is an object of the present invention to provide a vertical type magnetic recording medium which has magnetic characteristics superior to the magnetic recording medium having a Co—Cr layer.

The foregoing and other objects of the present invention have been attained by providing a magnetic recording medium which comprises a magentic alloy layer on a substrate wherein said magnetic alloy layer is made of 70–90 wt.% of Co and 30–10 wt.% of at least one of Si, Sb, Li, V, Ta, Ge and Pt and a magnetization axis of said magnetic alloy is substantially vertical to said layer.

DETAILED DESCRIPTION OF THE PREFERRED EMBODIMENTS

The vertical type magnetic recording medium having a magnetic alloy layer made of 70–90 wt.% of Co and 30–10 wt.% of at least one of Si, Sb, Li, V, Ta, Ge and Pt has excellent magnetic characteristics.

The condition required for the vertical type magnetic recording medium is to give a high crystalline orientation in perpendicular to the layer, high anisotropy and high coercive force so as to give easy vertical magnetization.

In accordance with the present invention, these characteristics are given by using a magnetic alloy layer made of Co and the other metal component of Si, Sb, Li, V, Ta Ge or Pt thereby providing a magnetic recording medium having the magnetic characteristics superior to those of the Co—Cr alloy layer.

The reason why the magnetic recording medium of the present invention has excellent magnetic characteristics is not clearly understood. According to many tests for various metals and metalloids which are solid-soluble into Co, the additional component combined with Co improves a thermal stability of a vertical crystalline orientation of Co (A half-value width $\Delta\theta_{50}$ of a rocking curve in hcp (002) reflection of Co in an X-ray diffraction is an index of the orientation). That is the thermally stable region having hcp structure of Co is enlarged by the combination of the metal or metalloid as the additional component.

With regard to the content of Co, when the content of Co is less than 70 wt.%, a ferromagnetism is too low whereas when it is more than 90 wt.%, the basic characteristic required for the vertical type magnetic layer $H_k < 4\pi M_s$ is not satisfied. Therefore, it is not suitable to use it as the vertical type magnetic recording medium.

A content of Co is preferably in a range of 77 to 88 wt.% especially about 80% to impart the optimum magnetic characteristics.

A thickness of the layer is selected from the range of 500 Å to 3 μm. When it is thinner than 500 Å, the magnetic moment is too low and a satisfactory S/N ratio is not given in the form of the magnetic recording medium whereas when it is more than 3 μm, the improvement of the characteristics corresponding to the increase of the cost is not found.

When the combination of Co—Si, Co—Li, Co—Si-other component or Co—Li-other component is employed for the magnetic layer, the optimum magnetic characteristics are given.

The present invention will be illustrated by certain examples and references which are provided for purposes of illustration only and are not intended to be limiting the invention.

EXAMPLE

Each thin layer made of each binary alloy of 80 wt.% of Co and 20 wt.% of each additional component of Si, Sb, Li, V, Ta, Ge or Pt and each ternary alloy of 80 wt.% of Co, 10 wt.% of Li and 10 wt.% of V; or 80 wt.% of Co, 10 wt.% of Si and 10 wt.% of Sb was formed on a film by a high frequency sputtering process. The condition of the sputtering process is shown in Table 1.

TABLE 1

| Substrate | Polyimide film |
| --- | --- |
| Background gas pressure | $4.9 \times 10^{-7}$ Torr |
| Argon gas pressure | $1.0 \times 10^{-2}$ Torr |
| High frequency electric power | 300 W |
| Temperature of substrate | 180° C. |
| Thickness of layer | 0.5 μm |

Each crystalline orientation (half-value width $\Delta\theta_{50}$ of rocking curve of hcp (002) reflection of Co by X-ray diffraction); each anisotropic magnetic field $H_k$; and each coercive force in vertical direction $H_c(\perp)$ of each layer were measured. The results are shown in Table 2.

The results show the following fact. The Co type alloy layers of the present invention impart sharp crystalline orientation high anisotropic magnetic field and high coercive force in vertical direction and are remarkably suitable for a vertical type magnetic recording medium.

The inventors have investigated almost all metals and metalloids which are solid-solubilizable with Co. As a result, the components of the present invention give superior magnetic characteristics.

The content of Co was changed in the similar experiments. When the content of Co is less than 70 wt.%, ferromagnetism is lowered whereas when it is more than 90 wt.%, the condition of $H_k > 4\pi M_s$ is not given whereby they are not suitable for the vertical type magnetic recording medium.

It has been found that the content of Co is preferably in a range of 77–88 wt.% especially about 80 wt.%.

When a thickness of the layer is less than 500 Å, the magnetic moment is too low whereby a desired S/N ratio is not given in the application as the magnetic recording medium. When the thickness is more than 3 μm, the improvement of the characteristics corresponding to the increase of the cost is not found.

TABLE 2

| Alloy | Crystalline orientation and magnetic characteristics | | |
|---|---|---|---|
| | $\Delta\theta_{50}$ [°] | $H_k$ [KOe] | $H_c (\perp)$ [KOe] |
| Co—Cr (reference) | 2.8 | 6.00 | 1.20 |
| Co—Si | 2.5 | 6.38 | 1.40 |
| Co—Sb | 2.6 | 6.05 | 1.20 |
| Co—Li | 2.5 | 6.38 | 1.40 |
| Co—V | 2.7 | 6.05 | 1.23 |
| Co—Ta | 2.7 | 6.05 | 1.29 |
| Co—Ge | 2.6 | 6.20 | 1.28 |
| Co—Pt | 2.6 | 6.20 | 1.31 |
| Co—Li—V | 2.4 | 6.42 | 1.42 |

TABLE 2-continued

| Alloy | Crystalline orientation and magnetic characteristics | | |
|---|---|---|---|
| | $\Delta\theta_{50}$ [°] | $H_k$ [KOe] | $H_c (\perp)$ [KOe] |
| Co—Si—Sb | 2.3 | 6.32 | 1.39 |

We claim:

1. A magnetic recording medium which comprises a magnetic alloy layer on a substrate wherein said magnetic alloy layer is made of 70-90 wt.% of Co and 30-10 wt.% of at least one of Si, Sb, Li, V, Ta, Ge and Pt and a magnetization axis of said magnetic alloy is substantially vertical to said layer.

2. The magnetic recording medium according to claim 1 wherein said magnetic alloy layer has a thickness of 500 Å to 3 μm.

* * * * *

UNITED STATES PATENT AND TRADEMARK OFFICE
CERTIFICATE OF CORRECTION

PATENT NO. : 4,542,062
DATED : September 17, 1985
INVENTOR(S) : Takada Kazuo, et al It is certified that error appears in the above-identified patent and that said Letters Patent is hereby corrected as shown below:

Title page:

-- The Priority information on this Letters Patent is incorrect. Please omitt this priority number:

Mar. 7, 1981      Japan      56-32764 --

Signed and Sealed this

Fourteenth Day of January 1986

[SEAL]

Attest:

Attesting Officer

DONALD J. QUIGG

Commissioner of Patents and Trademarks